(12) United States Patent
Subramonian et al.

(10) Patent No.: US 7,226,955 B2
(45) Date of Patent: Jun. 5, 2007

(54) MACROCELLULAR ACOUSTIC FOAM CONTAINING PARTICULATE ADDITIVE

(75) Inventors: Suresh Subramonian, Midland, MI (US); Chung P. Park, Waltham, MA (US)

(73) Assignee: Dow Global Technologies Inc., Midland, MI (US)

( * ) Notice: Subject to any disclaimer, the term of this patent is extended or adjusted under 35 U.S.C. 154(b) by 304 days.

(21) Appl. No.: 10/499,802

(22) PCT Filed: Jan. 15, 2003

(86) PCT No.: PCT/US03/02053

§ 371 (c)(1),
(2), (4) Date: Jun. 22, 2004

(87) PCT Pub. No.: WO03/072644

PCT Pub. Date: Sep. 4, 2003

(65) Prior Publication Data

US 2005/0086823 A1    Apr. 28, 2005

Related U.S. Application Data

(60) Provisional application No. 60/358,832, filed on Feb. 22, 2002.

(51) Int. Cl.
*C08J 9/00* (2006.01)
(52) U.S. Cl. .......................... 521/50; 521/92; 521/142; 525/63; 525/64
(58) Field of Classification Search .................. 521/50, 521/92, 142; 525/63, 64
See application file for complete search history.

(56) References Cited

U.S. PATENT DOCUMENTS

| | | | |
|---|---|---|---|
| 3,177,269 A | 4/1965 | Nowak et al. |
| 3,250,731 A | 5/1966 | Buhl et al. |
| 3,267,173 A | 8/1966 | Zeitlin |
| 3,270,090 A | 8/1966 | Nowak |
| 3,414,551 A | 12/1968 | Reid et al. |
| 3,499,819 A | 3/1970 | Lewis |
| 3,573,152 A | 3/1971 | Wiley et al. |
| 3,644,230 A | 2/1972 | Cronin |
| 3,645,992 A | 2/1972 | Elston |
| 3,708,555 A | 1/1973 | Gaylork |
| 3,862,265 A | 1/1975 | Steinkamp et al. |
| 3,868,433 A | 2/1975 | Bartz et al. |
| 3,873,643 A | 3/1975 | Wu et al. |
| 3,882,194 A | 5/1975 | Krebaum et al. |
| 3,884,451 A | 5/1975 | Stenmark et al. |
| 3,953,655 A | 4/1976 | Steinkamp et al. |
| 4,003,874 A | 1/1977 | Ide et al. |
| 4,100,076 A | 7/1978 | Ashman et al. |
| 4,214,054 A | 7/1980 | Watanabe et al. |
| 4,260,690 A | 4/1981 | Binsack et al. |
| 4,277,569 A | 7/1981 | Walker |
| 4,323,528 A | 4/1982 | Collins |
| 4,362,486 A | 12/1982 | Davis et al. |
| 4,443,584 A | 4/1984 | Michel |
| 4,446,254 A | 5/1984 | Nakae et al. |
| 4,506,056 A | 3/1985 | Gaylord |
| 4,578,428 A | 3/1986 | Clementini et al. |
| 4,578,431 A | 3/1986 | Shaw et al. |
| 4,612,155 A | 9/1986 | Wong et al. |
| 4,639,495 A | 1/1987 | Waggoner |
| 4,694,031 A | 9/1987 | Morita et al. |
| 4,714,716 A | 12/1987 | Park |
| 4,739,017 A | 4/1988 | Tabor et al. |
| 4,741,865 A | 5/1988 | Kintz et al. |
| 4,751,270 A | 6/1988 | Urawa et al. |
| 4,762,890 A | 8/1988 | Strait et al. |
| 4,788,264 A | 11/1988 | Ukita |
| 4,824,720 A | 4/1989 | Malone |
| 4,824,736 A | 4/1989 | Ehrig et al. |
| 4,839,017 A | 6/1989 | Taniguchi et al. |
| 4,853,997 A | 8/1989 | Giebel |
| 4,857,254 A | 8/1989 | Wong |
| 4,857,600 A | 8/1989 | Gross et al. |
| 4,862,890 A | 9/1989 | Stasz et al. |
| 4,916,198 A | 4/1990 | Scheve et al. |

(Continued)

FOREIGN PATENT DOCUMENTS

BE    692301    7/1967

(Continued)

OTHER PUBLICATIONS

Polyolefin Foam, Handbook of Polymer Foams and Technology, Chapter 9, C. P. Park, edited by D. Klempner and K. C. Frisch, Hanser Publishers, Munich, Vienna, New York, Barcelona, 1991.

(Continued)

*Primary Examiner*—Duc Truong

(57) ABSTRACT

A cellular thermoplastic polyolefin foam comprising at least one particulate additive in admixture with a polymer matrix is disclosed, along with a process and foamable gel for manufacturing the same, wherein the polyolefin matrix comprises at least one polymer resin graft-modified with at least one polar group selected from the group consisting of acid, acid ester, and acid anhydride, and salts thereof. The invention facilitates the manufacture of macrocellular foams useful for acoustic absorption having increased amounts of particulate additives that provide certain desired properties difficult to achieve without the particulate additives, such as improved flame retardancy.

20 Claims, No Drawings

U.S. PATENT DOCUMENTS

| | | | |
|---|---|---|---|
| 4,927,888 A | 5/1990 | Strait et al. | |
| 4,950,541 A | 8/1990 | Tabor et al. | |
| 5,001,197 A | 3/1991 | Hendewerk | |
| 5,026,798 A | 6/1991 | Canich | |
| 5,055,438 A | 10/1991 | Canich | |
| 5,059,376 A | 10/1991 | Pontiff et al. | |
| 5,079,302 A | 1/1992 | Lee et al. | |
| 5,086,112 A | 2/1992 | Togo et al. | |
| 5,137,975 A | 8/1992 | Kelusky | |
| 5,171,757 A | 12/1992 | Stobby et al. | |
| 5,180,788 A | 1/1993 | Vroomans | |
| 5,242,016 A | 9/1993 | Voss et al. | |
| 5,272,236 A | 12/1993 | Lai et al. | |
| 5,278,272 A | 1/1994 | Lai et al. | |
| 5,344,886 A | 9/1994 | Chang et al. | |
| 5,344,888 A | 9/1994 | Wild et al. | |
| 5,346,963 A | 9/1994 | Hughes et al. | |
| 5,367,022 A | 11/1994 | Kiang et al. | |
| 5,527,573 A | 6/1996 | Park et al. | |
| 5,552,096 A | 9/1996 | Auda et al. | |
| 5,585,058 A | 12/1996 | Kolosowski | |
| 5,605,936 A | 2/1997 | DeNicola, Jr. et al. | |
| 5,705,565 A | 1/1998 | Hughes et al. | |
| 5,736,618 A | 4/1998 | Poloso | |
| 5,883,151 A | 3/1999 | Raetzsch et al. | |
| 5,945,492 A | 8/1999 | Robert | |
| 5,955,547 A | 9/1999 | Roberts et al. | |
| 6,048,909 A | 4/2000 | Chaudhary et al. | |
| 6,218,476 B1 | 4/2001 | Coe | |
| 6,265,455 B1 * | 7/2001 | Braga | 521/92 |

FOREIGN PATENT DOCUMENTS

| | | |
|---|---|---|
| EP | 033220 | 1/1981 |
| EP | 0188926 | 3/1989 |
| EP | 0879844 | 11/1998 |
| GB | 1217231 | 12/1970 |
| GB | 2145961 | 4/1985 |
| JP | 10-204200 | 4/1998 |
| JP | 66-27421 | 8/1998 |
| WO | WO 99/10424 | 3/1999 |
| WO | 00/15700 | 3/2000 |
| WO | WO 00/15697 | 3/2000 |
| WO | WO 00/64966 | 11/2000 |
| WO | 01/70479 | 9/2001 |
| WO | 01/70860 | 9/2001 |
| WO | 01/70861 | 9/2001 |

OTHER PUBLICATIONS

Stevens, Polymer Chemistry (Addison-Wesley, 1975) p. 196-202.
Prog. Polym. Sci 24, The Synthesis of Polyolefin Graft Copolymers by Reactive Extrusion, Moad, (1999) p. 81-142.
ACS Simposium Series 395, Multiphase Polymers: Blends & Ionomers; Chapter 3, pp. 76-79, Jun. 1988.

* cited by examiner

MACROCELLULAR ACOUSTIC FOAM CONTAINING PARTICULATE ADDITIVE

CROSS REFERENCE STATEMENT

This application claims the benefit of U.S. Provisional Application No. 60/358,832, filed Feb. 22, 2002.

BACKGROUND OF THE INVENTION

Foams and foamed articles often find utility in acoustic systems for sound absorption and insulation. Such foams, when developed for different market segments (appliance, automotive, industrial, building and construction, etc) often need to meet certain acoustic performance requirements and there is also a desire to add certain particulate additives to foams to obtain certain desired properties. An example of such particulate additives are fire retardants and fire retardant adjuvants to meet certain fire-test-response characteristics (ASTM E176).

Unfortunately, the typical particulate additives, when added to the polymer resin formulation, often cause a number of problems during the manufacture of the foam that have an adverse affect on obtaining acoustically active macrocellular foams. They often act as nucleating agents in the foaming process and provide additional nucleation sites, resulting in the formation of a large number of small cells with variable properties. Unfortunately, foams having an average cell size less than 1.5 millimeter (mm) are often not as desirable as foams having a larger average cell size in certain end use applications, such as acoustic absorption.

U.S. Pat. No. 4,277,569 teaches the preparation of flame retardant polyolefin foams for thermal insulation and padding. However, that patent does not describe macrocellular foams or flame retardant macrocellular foams for acoustic applications or their preparation.

Japanese Laid Open Patent Application No. 10-204200 describes olefin resin foams for use in vacuum molding made from 100 parts by weight of an olefin type resin comprising 30 to 90 percent by weight propylene type resin and 70 to 10 percent by weight ethylene type resin, 1 to 100 parts by weight of a brominated compound and 0.1 to 10 parts by weight of antimony trioxide having an average particle size of 0.4 microns or smaller. Macrocellular foams useful for acoustic applications are not described.

WO 00/15697 describes a macrocellular acoustically active foam which may be surface treated with a solution containing certain fire retardant materials. While that procedure is able to confer fire retardancy, it requires the extra steps of treating the foam after extrusion and perforation and then drying the foam to remove the liquid media used to apply the fire retardant.

Therefore, a significant market need still exists for a large cell, acoustically active foam containing particulate additives. This need is not only generally applicable to polymer foams, but is also particularly acute in the area of thermoplastic foams (that is, foams that are substantially uncrosslinked and capable of being remelted) and foams that also resist water absorption such that they may be used in humid or wet environments without losing performance or potentiating corrosion or microbial growth problems. These, and other problems as described below, are solved by the present invention.

BRIEF SUMMARY OF THE INVENTION

One aspect of the present invention is a cellular polymer foam comprising:
A) at least one particulate additive in admixture with
B) a polymer matrix, wherein the polymer matrix comprises at least one polymer resin graft-modified with at least one polar group selected from the group consisting of acid, acid ester, or acid anhydride, or salt thereof.

Another aspect of this invention is foamable gel for making the foam according to claim 1 comprising:
1) at least one particulate additive in admixture with at least one polymer matrix and
2) at least one blowing agent, wherein the polymer matrix comprises at least one polymer resin graft-modified with at least one polar group selected from the group consisting of acid, acid ester, or acid anhydride, or salt thereof.

Yet another aspect of this invention is a method for making a macrocellular polymer foams containing at least one particulate additive comprising expanding the aforementioned foamable gel.

Yet another aspect of this invention is the use of the above macrocellular acoustic foam as an acoustic absorption or acoustic insulation material.

This invention is further described in the detailed description which follows.

DETAILED DESCRIPTION OF THE INVENTION

Definitions

All references herein to elements or metals belonging to a certain Group refer to the Periodic Table of the Elements published and copyrighted by CRC Press, Inc., 1989. Also any reference to the Group or Groups shall be to the Group or Groups as reflected in this Periodic Table of the Elements using the IUPAC system for numbering groups.

Any numerical values recited herein include all values from the lower value to the upper value in increments of one unit provided that there is a separation of at least 2 units between any lower value and any higher value. As an example, if it is stated that the amount of a component or a value of a process variable such as, for example, temperature, pressure, time and the like is, for example, from 1 to 90, preferably from 20 to 80, more preferably from 30 to 70, it is intended that values such as 15 to 85, 22 to 68, 43 to 51, 30 to 32 etc. are expressly enumerated in this specification. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner. In particular, the end points of ranges for a particular subject are intended to be freely combinable with other stated ranges for the same subject unless stated otherwise, for example, a stated lower end of a range may be combined with a stated upper end of a range for the same subject, such as average cell size.

The term "micron" means one-millionth of a meter and is interchangeable with the term "micrometer" and the abbreviation "µ".

Unless stated otherwise, the term "flame retardant" when used by itself means any compound or mixture of compounds which imparts flame resistance to the foam compositions of the present invention other than the particulate flame retardant adjuvants described below. This term includes, but is not limited to, organic flame retardants such as halogen-containing compounds or mixtures of compounds.

The term "particulate additive" means an additive that is in the form of detectable discrete particles in the polymer matrix of the foams of this invention not only at room temperature, but also at the temperature of the polymer(s) comprising the polymer matrix during expansion of the foam. That temperature is generally the lowest temperature at which all the polymer components of the polymer matrix are in a molten state having a viscosity appropriate for foam expansion. Alternatively or in addition, the term may be defined to include any additive that, when added to a foamable gel at a conventional rate, or if there is no conventional rate then at 5 phr, results in a measurable decrease in the average cell size of the foam made from the foamable gel compared to a foam made under the same conditions except that the foamable gel does not contain the particulate additive.

The term "particulate flame retardant adjuvant" means particulate materials which increase the flame resistance of the foam compositions of the present invention when they are present in an amount of at least 1 part per hundred parts of total polymer resin (phr). Preferably they enhance the effectiveness of flame-retardants that are also present in the polymer matrix of the foam, including those in a form other than as particles, such as most organic flame retardants. This term is intended to include, but not be limited to, particulate flame retardant synergists, char forming materials, smoke suppressants and particulate flame retardants. They are preferably primarily comprised of an inorganic compound or a mixture of inorganic compounds. Unless otherwise specified herein, the term "flame retardant adjuvant" when used in the context of the present invention means "particulate flame retardant adjuvant" and the terms "flame retardant synergist" and "synergist" when used in the context of the present invention means "particulate flame retardant synergist". The flame retardant synergists are encompassed by the more generic term "particulate flame retardant adjuvant". The latter applies by analogy to the particulate char forming materials and smoke suppressants, but the distinction in wording is maintained herein between the generic expression "flame retardant" (without the term "adjuvant") and the subgeneric expression "particulate flame retardant".

The term "flame retardant package" means a combination of flame retardant(s) and flame retardant adjuvant(s) with each other. A combination of flame retardant(s), flame retardant synergist(s) and, optionally, smoke suppressant(s) is a generic example of a fire retardant package.

The term "interpolymer" is used herein to indicate a polymer wherein at least two different monomers are polymerized to make the interpolymer. This includes copolymers, terpolymers, etc.

The term "melt flow rate" as used herein means a flow rate measured according to ASTM D1238, typically at 2.16 kg. When in reference to ethylene polymers measured under the conditions of 2.16 kg, and 190 degrees Celsius, the melt flow rate is generally referred to by the term "melt index". For the sake of simplicity, the term "melt flow rate" shall be assumed to also include, unless stated otherwise, the melt index values for ethylene polymers.

The term "macrocellular acoustic foam" is used herein to indicate a foam having an average cell size according to ASTM D3575 greater than 1.5 mm, more preferably at least 2 mm, even more preferably at least 3 mm, even more preferably at least 4 mm, and even more preferably at least 4.5 mm, preferably up to 20 mm, also preferably up to 15 mm, and for some end uses up to 10 mm is particularly preferred. At a thickness of 35 mm, macrocellular foams may have an average sound absorption coefficient (measured via ASTM E1050 at 250, 500, 1000 and 2000 hertz (Hz) sound frequencies) of greater than 0.15, preferably greater than 0.20, more preferably greater than 0.25, even more preferably greater than 0.30.

A) Particulate Additive

The particulate additive is an additive that is comprised of particles having an average particle size preferably not greater than 100 microns, more preferably not greater than 10 microns and still more preferably not greater than 1 micron and preferably at least 0.01 micron, more preferably at least 0.1 micron, and even more preferably at least 1 micron. Preferably at least 65 percent of the particles have a particle size within 50 percent, more preferably within 20 percent, of the average particle size of the particles per 100 g sample of the foam.

Unless specified otherwise, the average particle size referred to herein is the volumetric average particle size. The average particle size and the particle size distribution of the particulate additive as such may be measured by appropriate conventional particle size measuring techniques such as sedimentation, photon correlation spectroscopy, field flow fractionation, disk centrifugation, transmission electron spectroscopy, and dynamic light scattering. A preferred technique is to measure dynamic light scattering using a device such as a Horiba LA-900 Laser Scattering particle size analyzer (Horiba Instruments, Irvine, Calif., USA). The volumetric distribution relates to the weight distribution.

When the particulate additive is in the foam polymer matrix, the average particle size and particle size distribution may be determined using techniques known in the art. One approach is to use an electron microprobe, such as a Cameca SX-50 electron microprobe, to collect element maps of the particles from a cross-section of the foam and then use a scanning electron microscope, such as a JEOL 6320 field emission scanning electron microscope, to create an image of the mapped particles to examine their surface and cross-sectional features. By overlaying the elemental map over the information derived from the scanning electron microscope image, one can selectively determine the average particle size and particle size distribution of the particulate additive in question.

The particles are preferably substantially inorganic, that is, they preferably have a surface that is predominantly non-hydrocarbon. Examples of inorganic particles include oxides, halides, borates, silicates and stannates of various elements selected from the Periodic Table of Elements, particularly of metals, such as the transition metals, such as antimony, zinc, or tin, and metals selected from Group I or Group II, such as magnesium, of the Periodic Table of Elements. The particles are preferably substantially solid at foam extrusion temperatures.

Examples of suitable particulate additives are found among various flame retardant adjuvants, flame retardants, antioxidants such as phosphites (for example, Irgafos™ 168, which is a trademark of and available from the Ciba Geigy Corporation), antiblock additives, colorants, pigments, fillers, and acid scavengers.

Examples of particulate inorganic flame retardant adjuvants are found among particulate flame retardant synergists, char forming materials, and smoke suppressants.

Flame retardant synergists include, but are not limited to, metal oxides such as antimony trioxide, antimony pentoxide, iron oxide, tin oxide, zinc oxide, aluminum trioxide, alumina (for example, alumina having an average particle size less than 0.5 microns are available from Nyacol Nano Technologies, Inc.), bismuth oxide, molybdenum trioxide (for example, molybdenum trioxide having an average particle size less than 0.5 microns are available from Nyacol Nano Technologies, Inc.), and tungsten trioxide; zinc borate; antimony silicates; zinc stannate; zinc hydroxystannate; ferrocene and mixtures thereof, antimony trioxide and antimony pentoxide being preferred. Antimony trioxide is available from the Great Lakes Chemical Corporation under the trademarks TRUTINT™ for average particle sizes of at least 1 micron and MICROFINE™ for average particle sizes less than 1 micron. Antimony pentoxide having an average particle size less than 0.1 micron is available under the trademark NYACOL™ from Nyacol Nano Technologies, Inc. Ashland, Mass., U.S.A.

Particulate char forming materials include, but are not limited to, clay fillers, such as organoclay nanocomposites. Organoclay nanocomposites having an effective particle size less than 1 micron after incorporation into the polymer matrix of a polymer foam of the present invention are available under the trademark CLOISITE™ from Southern Clay Products, Inc., Gonzales, Tex., U.S.A.

Particulate smoke suppressants include, but are not limited to, zinc borate, tin oxide, and ferric oxide. Zinc borate having an average particle size less than 0.5 microns is available from Nyacol Nano Technologies, Inc.

Solid particulate flame retardants include inorganic fire retardants, such as magnesium hydroxide and magnesium carbonate. Magnesium hydroxide, preferably having a particle size in the range from less than 1 micron to at least 2 nanometers, is available from Nyacol Nano Technologies, Inc., and is available from Morton International Corporation under VERSAMAG™, such as VERSAMAG™ UF. Magnesium carbonate is also available from Morton International Corporation under ELASTOCARB™, such as ELASTOCARB™ Tech Light and ELASTOCARB™ Tech High.

The flame retardants and flame retardant adjuvants may be used individually or in combination with each other. They, and other flame retardant adjuvants having the required and preferred particle sizes, may be made using techniques well known in the art, and may be incorporated into the polymer matrix. See, for example, U.S. Pat. No. 5,409,980 incorporated herein by reference, which describes synergists and combinations of the same with flame retardants suitable for the present invention.

Preferred examples of fillers are talc, carbon black, carbon fibers, calcium carbonate, alumina trihydrate, glass fibers, marble dust, cement dust, clay, feldspar, silica or glass, fumed silica, alumina, magnesium oxide, magnesium hydroxide, antimony oxide, zinc oxide, barium sulfate, aluminum silicate, calcium silicate, titanium dioxide, titanates, glass microspheres or chalk.

Acid scavengers include, but are not limited to, zeolite and hydrotalcite.

Other particulate additives include calcium carbonate, talc, titanium oxide, silica, barium sulfate, diatomaceous earth, mixtures of citric acid and sodium bicarbonate, and residual catalyst particles in the polymer foam matrix that originate from a process used to make one or more of the polymers in the polymer foam matrix, such as the process used to make LLDPE. The particulate additive may, for example, be a nucleating agent, such as calcium carbonate, talc, clay, titanium oxide, silica, barium sulfate, diatomaceous earth, and the like.

The particles may be treated to reduce agglomeration or improve dispersibility in a polymer matrix or in certain media. Particulate antimony compounds may, for example, be surface modified with a coupling agent, such as with an organic titanate as described, for example, in U.S. Pat. No. 4,100,076. Antimony oxide particles, such as colloidal antimony pentoxide, may be treated to reduce degradation of the polymer resin while the resin is at an elevated temperature, such as during extrusion of the foam of this invention, as taught in, for instance, U.S. Pat. No. 4,741,865. WO 00/64966 describes how to make certain vacuum de-aerated powdered polymer additives having a particle size range overlapping the less than one micron range, including flame retardant adjuvants suitable for use in the foams of this invention. Each of the above patents and published patent applications are incorporated herein by reference for their relevant disclosure.

The total amount of particulate additive is preferably at least 0.1 phr, more preferably at least 1 phr, and more preferably at least 2 phr, and preferably up to 10 phr, more preferably up to 6 phr. The parts by weight per hundred parts by weight of resin ("phr") are based on the total parts by weight of polymer in the polymer matrix of the foam.

B) Polymer Matrix

The polymers comprising the polymer matrix of the foam according to the present invention, and also used to make the foam and foamable gel starting material according to the present invention, may be any polymers capable of forming a foam structure. Preferred polymers are thermoplastic. They are preferably polyolefins, such as homopolymers and interpolymers of α-olefin, vinyl aromatic monomer units, and/or functional monomers, and combinations thereof, and combinations (that is, blends) of such polymers, as further described below.

Preferably the resin to be foamed comprises an ethylene or $C_3$-$C_{20}$ α-olefin homopolymer resin, an ethylene/$C_3$-$C_{20}$ α-olefin interpolymer (including polyolefin elastomers, polyolefin plastomers, and/or one or more substantially random interpolymers), or a blend of one or more of these polymers. The resin to be foamed may also comprise a blend of one or more of said ethylene or $C_3$-$C_{20}$ α-olefin homopolymers with a second polymer component. This second polymer component can include, but is not limited to, any of the above-mentioned polymers and is preferably selected from ethylene/$C_3$-$C_{20}$ α-olefin interpolymers (including polyolefin elastomers, polyolefin plastomers, and/or one or more substantially random interpolymers), or combinations thereof.

In a preferred embodiment, the resin may also comprise a minor amount (that is, less than 50 weight-percent) of interpolymers of α-olefin with vinyl aromatic monomer units and/or functional monomers, which is blended with one or more of the α-olefin polymers. Preferred functional monomers include vinyl acetate, an alkyl acrylate such as methyl acrylate or ethyl acrylate, and acrylic acid.

The α-olefin polymers are polymers or interpolymers containing repeated units derived by polymerizing an α-olefin. As defined herein, the α-olefin polymer contains essentially no polymerized monovinylidene aromatic monomers and no sterically hindered aliphatic or cycloaliphatic vinyl or vinylidene monomers. Particularly suitable α-olefins have from 2 to about 20 carbon atoms, preferably from 2 to about 8 carbon atoms, and include ethylene, propylene, 1-butene, 4-methyl-1-pentene, 1-hexene, 1-octene and the like. Preferred α-olefin polymers are homopolymers of ethylene or propylene and interpolymers of ethylene with a $C_3$-$C_8$ α-olefin. The α-olefin polymer may also contain, in polymerized form, one or more other non-aromatic monomers that are interpolymerizable with the α-olefin and which contain an aliphatic or cycloaliphatic group. Such monomers include, for example, vinyl acetate, acrylic acid, methacrylic acid, esters of acrylic or methacrylic acid and acid anhydrides such as maleic anhydride. The α-olefin polymer preferably contains at least 75 percent by weight, preferably at least 95 percent by weight, of polymerized α-olefin monomers. More preferably, the α-olefin polymer contains at least 85 percent by weight polymerized ethylene, with polymerized α-olefin monomers constituting the remainder of the polymer. In other words, the α-olefin polymer may contain polyethylene or a copolymer of ethylene and up to about 15 percent of another α-olefin.

Particularly suitable α-olefin polymers include low density polyethylene (LDPE), which term is used herein to designate polyethylene homopolymers made in a high pressure, free radical polymerization process. These LDPE polymers are characterized by having a high degree of long chain branching. LDPE useful in this invention preferably has a density of about 0.910 to 0.970 g/cc, more preferably less than or equal to 0.935 g/cc (ASTM D792) and preferably has a melt index of at least 0.02, more preferably at least 0.05, even more preferably at least 0.1, and even more preferably at least 0.2, preferably up to 100, more preferably up to 50, even more preferably up to 30, and even more preferably up to 20, grams per 10 minutes (as determined by ASTM Test Method D1283, condition 190° C./2.16 kg).

The so-called linear low density polyethylene (LLDPE) and high density polyethylene (HDPE) products are also useful herein. These polymers are homopolymers of polyethylene or copolymers thereof with one or more higher α-olefins and characterized by the near or total absence (less than 0.01/1000 carbon atoms) of long chain branching. LLDPE and HDPE are made in a low pressure process employing conventional Ziegler-Natta type catalysts, as described in U.S. Pat. No. 4,076,698, which is incorporated herein by reference. LLDPE and HDPE are generally distinguished by the level of α-olefin comonomer that is used in their production, with LLDPE containing higher levels of comonomer and accordingly lower density. Suitable LLDPE polymers having a density of from about 0.85 to about 0.940 g/cc (ASTM D792) and a melt index (ASTM D1238, condition 190° C./2.16 kg) of about 0.01 to about 100 grams/10 minutes. Suitable HDPE polymers have a similar melt index, but have a density of greater than about 0.940 g/cc.

LLDPE polymers having a homogeneous distribution of the comonomer are described, for example, in U.S. Pat. No. 3,645,992 to Elston and U.S. Pat. Nos. 5,026,798 and 5,055,438 to Canich, which are incorporated herein by reference.

Yet another type of α-olefin polymer are substantially linear olefin polymers as described in U.S. Pat. Nos. 5,272,236 and 5,278,272, incorporated herein by reference. The substantially linear olefin polymers are advantageously homopolymers of a $C_2$-$C_{20}$ α-olefin or, preferably, interpolymers of ethylene with at least one $C_3$-$C_{20}$ α-olefin and/or a $C_4$-$C_{18}$ diolefin. These polymers contain a small amount of long-chain branching (that is about 0.01 to 3, preferably 0.01-1 and more preferably 0.3-1 long chain branch per 1000 carbon atoms) and typically exhibit only a single melting peak by differential scanning calorimetry. Particularly suitable substantially linear olefin polymers have a melt index (ASTM D1238, Condition 190° C./2.16 kg) of from about 0.01 to about 1000 g/10 min, and a density of from 0.85 to 0.97 g/cc, preferably 0.85 to 0.95 g/cc and especially 0.85 to 0.92 g/cc. Examples include polyolefin plastomers, such as those marketed by The Dow Chemical Company under the trademark AFFINITY™ and polyethylene elastomers, such as those marketed by Du Pont Dow Elastomers LLC under the trademark ENGAGE™.

Another suitable α-olefin polymer includes propylene polymers. The term "propylene polymer" as used herein means a polymer in which at least 50 weight percent of its monomeric units are derived directly from propylene. Suitable ethylenically unsaturated monomers other than propylene that may be included in the propylene polymer, include α-olefins, vinylacetate, methylacrylate, ethylacrylate, methyl methacrylate, acrylic acid, itaconic acid, maleic acid, and maleic anhydride. Appropriate propylene interpolymers include random, block, and grafted copolymers or interpolymers of propylene and an olefin selected from the group consisting of ethylene, $C_4$-$C_{10}$ 1-olefins, and $C_4$-$C_{10}$ dienes. Propylene interpolymers also include random terpolymers of propylene and 1-olefins selected from the group consisting of ethylene and $C_4$-$C_8$ 1-olefins. The $C_4$-$C_{10}$ 1-olefins include the linear and branched $C_4$-$C_{10}$ 1-olefins such as, for example, 1-butene, isobutylene, 1-pentene, 3-methyl-1-butene, 1-hexene, 3,4-dimethyl-1-butene, 1-heptene, 3-methyl-1-hexene, and the like. Examples of $C_4$-$C_{10}$ dienes include 1,3-butadiene, 1,4-pentadiene, isoprene, 1,5-hexadiene, and 2,3-dimethyl-1,3-hexadiene. As used herein, the term "interpolymers" means polymers derived from the reaction of two of more different monomers and includes, for example, copolymers and terpolymers.

The propylene polymer material may be comprised solely of one or more propylene homopolymers, one or more propylene copolymers, and blends of one or more of each of propylene homopolymers and copolymers. The polypropylene preferably comprises at least 70, even more preferably at least 90, and even more preferably 100, weight percent propylene monomer derived units (that is, the propylene homopolymers are preferred).

The propylene polymer preferably has a weight average molecular weight ($M_w$) of at least 100,000. $M_w$ can be measured by known procedures.

The propylene polymer also preferably has a branching index less than 1. The branching index is an approach to quantifying the degree of long chain branching selected for this particular invention. The definition of branching index and procedure for determining the same is described in column 3, line 65 to column 4, line 30, of U.S. Pat. No. 4,916,198, which is incorporated herein by reference. The branching index is more preferably less than 0.9, and even more preferably less than 0.4.

The propylene polymer preferably has a tan δ value not greater than 1.5, preferably not greater than 1.2, even more preferably not greater than 1.0, and even more preferably not greater than 0.8. Tan δ may be calculated from g"/g', where g" is the loss modulus of the propylene polymer and g' is storage modulus of the propylene polymer melt using a 2.5 mm thick and 25 mm diameter specimen of the propylene polymer at 190 C at a one Radian per second oscillating frequency. These parameters may be measured using a mechanical spectrometer, such as a Rheometrics Model RMS-800 available from Rheometrics, Inc., Piscataway, N.J., U.S.A. Further details of how to carry out this determination of the tan δ, g' and g" values is provided in column 5, lines 59 to 64, and column 6, lines 4 to 29, of U.S. Pat. No. 5,527,573, which is incorporated herein by reference.

In addition or in the alternative, the propylene polymer preferably has a melt tension of at least 7 centiNewtons (cN), more preferably at least 10 cN, and even more preferably at least 15 cN, and even more preferably at least 20 cN. Preferably, the propylene polymer has a melt tension not greater than 60 cN, more preferably not greater than 40 cN. The term "melt tension" as used throughout this description refers to a measurement of the tension in cN of a strand of molten polymer material at extruded from a capillary die with a diameter of 2.1 mm and a length of 40 mm at 230° C. at an extrusion speed of 20 mm/minute (min.) and a constant take-up speed of 3.14 meter/minute using an apparatus known as a Melt Tension Tester Model 2 available from Toyo Seikl Seisaku-sho, Ltd. This method for determining melt tension is sometimes referred to as the "Chisso method".

In addition or in the alternative, the propylene polymer preferably has a melt strength of at least 10 centiNewtons (cN), more preferably at least 20 cN, and even more preferably at least 25 cN, and even more preferably at least 30 cN. Preferably, the propylene polymer has a melt strength not greater than 60 cN, more preferably not greater than 55 cN. The term "melt strength" throughout this description refers to a measurement of the tension in cN of a strand of molten polymer material extruded from a capillary die with an diameter of 2.1 mm and a length of 41.9 mm at 190° C. at a rate of 0.030 cc/sec. and stretched at a constant acceleration to determine the limiting draw force, or strength at break, using an apparatus known as a Gottfert Rheotens™ melt tension apparatus available from Gottfert, Inc.

The propylene polymer used in the process of the invention preferably also has a melt elongation of at least 100 percent, more preferably at least 150 percent, most preferably at least 200 percent as measured by the same Rheotens™ melt tension apparatus and general procedure described above.

The propylene polymer material preferably also has a melt flow rate of at least 0.01 more preferably at least 0.05, even more preferably at least 0.1 g/10 min., and even more preferably at least 0.5 g/10 min. up to 100, more preferably up to 50, even more preferably up to 20, and even more preferably up to 10, g/10 min. Throughout this description, the term "melt flow rate" refers to a measurement conducted according to American Society for Testing and Materials (ASTM) D1238 condition 230° C./2.16 kg. (aka Condition L).

In addition, α-olefin polymers that have been subjected to coupling or light crosslinking treatments are useful herein, provided that they remain melt processable. Such grafting or light crosslinking techniques include silane grafting as described in U.S. Pat. No. 4,714,716 to Park; peroxide coupling as described in U.S. Pat. No. 4,578,431 to Shaw et al., and irradiation as described in U.S. Pat. No. 5,736,618 to Poloso, each of which is incorporated herein by reference. Preferably, the treated polymer has a gel content of less than 10%, more preferably less than 5%, most preferably less than 2% by weight, as determined by gel permeation chromatography. Treatment of this type is of particular interest for HDPE, LLDPE or substantially linear polyethylene copolymers, as it tends to increase the melt tension and melt viscosity of those polymers to a range that improves their ability to be processed into foam in an extrusion process.

Preferred propylene polymers include those that are branched or lightly cross-linked. Branching (or light cross-linking) may be obtained by those methods generally known in the art, such as chemical or irradiation branching/light cross-linking. One such resin which is prepared as a branched/lightly cross-linked polypropylene resin prior to using the polypropylene resin to prepare a finished polypropylene resin product and the method of preparing such a polypropylene resin is described in U.S. Pat. No. 4,916,198, which is hereby incorporated by reference. Another method to prepare branched/lightly cross-linked polypropylene resin is to introduce chemical compounds into the extruder, along with a polypropylene resin and allow the branching/lightly cross-linking reaction to take place in the extruder. This method is illustrated in U.S. Pat. No. 3,250,731 with a polyfunctional azide, U.S. Pat. No. 4,714,716 (and published International Application WO 99/10424) with an azidofunctional silane and EP 879,844-A1 with a peroxide in conjunction with a multi-vinyl functional monomer. The aforementioned U.S. patents are incorporated herein by reference. Irradiation techniques are illustrated by U.S. Pat. Nos. 5,605,936 and 5,883,151, which are also incorporated by reference. The polymer composition used to prepare the foam preferably has a gel content of less than 10 percent, more preferably less than 5 percent, per ASTM D2765-84, Method A.

If an ethylene polymer, such as the ethylene homopolymer, is blended with a propylene polymer, the weight ratio of the propylene polymer to the ethylene polymer is preferably at least 35:65, more preferably at least 1:1, preferably up to 9:1, and more preferably up to 7:1. Such blends may optionally contain at least one substantially random interpolymer, such as an ethylene/styrene interpolymer, as described under a separate heading below. An advantage of these foams is the ability to use it in locations where a high service temperature is required and yet have a foam that is thermoformable and potentially recyclable. An example is in the compartment of a motor, such as an internal combustion engine, such as found on a vehicle, electric generator, compressor or pump. An indication of high service temperature is resistance to heat distortion at elevated temperatures. As used herein, the expression, "heat distortion temperature" refers to the maximum temperature at which the foam body does not shrink more than 5 percent by volume during an exposure to that temperature for one hour. Preferably the heat distortion temperature of the foams according to the present invention is at least 130° C., more preferably at least 140° C., and even more preferably at least 150° C.

B1) Graft-Modified Polymer of Polymer Matrix B)

At least one of the above-described polymers comprised in polymer matrix B) is graft-modified with at least one polar group selected from the group consisting of acids, acid salts, acid esters and acid anhydrides. The acid of the acid, acid ester, and acid anhydride, and salts thereof, is preferably a mono-unsaturated carboxylic acid. The mono-unsaturated carboxylic acid preferably contains at least 2, more preferably at least 3, carbon atoms and preferably up to 50, more preferably up to 20, even more preferably up to 12, and even more preferably up to 8, carbon atoms. Examples include, but are not limited to, (meth)acrylic acid, (meth)acrylate esters, and maleic anhydride (also referred to herein as "MAH"). The grafted on polar group is generally a terminal or pendant group on the polymer chain(s) of the graft-modified polymer.

The presence and quantity of such functionality grafted to polymers may be determined by those skilled in the analysis of polymers using well-known methods. Such methods may employ, for example, infrared spectroscopy (FTIR), nuclear magnetic resonance (NMR) spectroscopy, and chemical methods. Several such methods are described in detail in Part 4 of the article by Moad cited below.

The synthesis of graft-modified polymers, especially graft-modified polyolefin polymers and copolymers, is often carried out by reactive extrusion. A widespread method for carrying out such reactive extrusion involves free radical-induced grafting. Such grafting typically involves combining a free-radical initiator and a coagent with the polymer as the polymer is conveyed through the extruder. Commonly used free-radical initiators include peroxides, such as dialkyl peroxides (for example, dicumyl peroxide). Commonly used coagents include monoene monomers and, for grafting polar groups onto propylene polymers, polyfunctional monomers such as triacrylate monomer in what is sometimes referred to as "novel reactive processing". Coagents are generally used to improve grafting yields by reducing side reactions.

Such synthesis processes are well known and are described, for example, in Stevens, *Polymer Chemistry* (Addison-Wesley, 1975) pp. 196-202, more recently, in Moad, "The synthesis of polyolefin graft copolymers by reactive extrusion", Prog. Polym. Sci. 24 (1999) 81-142, and in numerous published patents, some of which are cited in the respective descriptions of the acid, acid ester, and acid anhydride graft-modifed polymers that follow. Typical synthesis examples are also described in European Patent Number 188926, Belgian Patent Number 692301, JP 27421/66, U.S. Pat. No. 3,499,819, and U.S. Pat. No. 5,137,975, which are incorporated herein by reference.

Graft-modified polymers suitable for use in this invention may also be made by polymer synthesis.

Suitable graft-modified materials are available commercially and are produced by, for example, DuPont under BYNEL™ and FUSABOND®; BP Performance Polymers, Inc., Hackettstown, N.J., U.S.A. under POLYBOND™ (also available from Crompton Corporation); Mitsui Chemical Corporation under ADMER™; Quantum under PLEXAR™; Elf Atochem under OREVAC™; Morton International under TYMOR™, which is made by Hercules and distributed by Himont under HERCOPRIME™ and distributed by Eastman under EPOLENE™; DSM under YPAREX®; Hoechst AG under HOSTAMON™, Exxon Chemical under EXXELOR™; and The Dow Chemical Company under PRIMACOR®. These and other graft-modified polymers may be combined, preferably blended, with the above-described polymers which have not been graft-modified or which have been graft-modified to a lesser extent.

Graft modification may also be carried out in-situ before, during, and/or after combining the polymer resin components of the polymer matrix with the particulate additive(s) according to one or more of the above-described grafting methods.

More detailed descriptions of preferred grafted polymers and preferred combinations of such polymers with each other and with the above-described polymers that are not graft-modified, which are suitable for use in this invention, follows.

1. Acid-Modified Polymers

A suitable source of graft-modification are acids and their salts (for example, metal salts, such as alkali metal salts). Preferred are unsaturated carboxylic acid monomers and their salts, especially those having at least 3 carbon atoms up to 12 carbon atoms, more preferably up to 8 carbon atoms, and even more preferably up to 4 carbon atoms. The acid monomers are preferably unsaturated aliphatic or cycloaliphatic groups, which preferably have up to 8, more preferably up to 4, and even more preferably up to 2, carboxylic acid groups. Examples of such monomers include acrylic acid, methacrylic acid, maleic acid, fumaric acid, himic acid, itaconic acid, crotonic acid, isocrotonic acid, cinnamic acid, citraconic acid, mesaconic acid, maleic acid and succinic acid, combinations thereof, and salts thereof. In a preferred embodiment, at least one polymer is graft-modified with acrylic acid and/or methacrylic acid.

The acid monomers grafted onto the polymer may be present as pendant or terminal groups. Such pendant or terminal groups may be not only single acid monomer groups, but also multiple acid monomer groups, which form poly(acid) groups on the polymer chain(s) of the graft-modified polymer. Poly(acid) groups preferably contain at least 2, more preferably at least 3, acid groups, and preferably up to 20, more preferably up to 12, and even more preferably up to 8, acid groups. Such poly(acid) groups are generally, but not necessarily, the result of polymerization of at least one of the above described acid monomers during the grafting process. The poly(acid) groups may also be partially or completely pre-polymerized prior to the grafting process. The polymerization may be homopolymerization of an acid monomer, or interpolymerization with one or more additional acid monomers, and/or non-acid, monomers. In a preferred embodiment, the group grafted onto the polymer is acrylic acid or methacrylic acid and the resulting pendant groups are homopolymers of multiple acrylic acid groups or multiple methacrylic acid groups.

Pendant acid groups may be distinguished from polar groups copolymerized into the polymer chain(s) by the at least two carbon atoms of a hydrocarbylene moiety connecting the closest carbonyl moiety of the acid to the polymer chain. Copolymerized acid groups are generally connected to the polymer chain by less than two carbon atoms from the closest carbonyl atom of the acid moiety. This difference can be detected using spectroscopic analysis, such as Fourier transform infrared spectroscopy (FTIR).

Processes for grafting such acids onto polymers are well known and described in the patent and technical literature. Grafting of (meth)acrylic acid onto various polyolefin polymers is described, for example, in U.S. Pat. No. 3,177,269; grafting of acrylic acid onto polypropylene is described, for example, in GB-A-1,217,231; U.S. Pat. No. 3,862,265; U.S. Pat. No. 3,884,451; U.S. Pat. No. 3,953,655; U.S. Pat. No. 4,003,874; and U.S. Pat. No. 4,578,428; grafting of itaconic acid onto propylene polymers is described, for example, in U.S. Pat. No. 4,694,031; grafting of acrylic acid onto ethylene-propylene copolymer is described, for example, in GB-A-1,217,231; U.S. Pat. No. 3,953,655; U.S. Pat. No. 4,003,874; U.S. Pat. No. 4,260,690; and EP-A-33220; and grafting of acrylic acid onto ethylene polymers described, for example, in U.S. Pat. No. 3,270,090; U.S. Pat. No. 4,003,874; U.S. Pat. No. 4,260,690; U.S. Pat. No. 4,362,486; EP-A-33220; and U.S. Pat. No. 4,739,017. Each of the aforementioned patents is incorporated herein by reference for their relevant disclosure.

Acid-modified polymers are commercially available from various sources. Acid-modified ethylene acrylate polymers (Series 2000) and acrylate-modified ethylene/vinyl acetate resins (Series 3100) are available from DuPont under BYNEL™.

2. Acid Ester-Modified Polymers

Another suitable source of graft-modification are acid esters and their salts (for example, metal salts, such as alkali metal salts, of partial, or half, esters). Preferred are esters of the above-described acid groups, including the above-described mono(acids) and poly(acids), and particularly esters of the above-described unsaturated carboxylic acids. The acid esters preferably have at least 3 carbon atoms and preferably up to 24 carbon atoms, more preferably up to 8 carbon atoms, even more preferably up to 4 carbon atoms, and even more preferably up to 4 carbon atoms, in each ester group. Acid esters derived from acids that contain more than one acid group may be partially or fully esterified. Partially esterified acid esters may thus contain both non-esterified acid groups and esterified acid groups. The ester groups are preferably hydrocarbon groups, such as aliphatic (for example, alkyl) or cycloaliphatic (for example, cycloalkyl) groups, and/or preferably comprise nonhydrocarbon groups such as glycidyl and/or amino groups.

Examples of such monomers include alkyl (meth)acrylates such as methyl methacrylate, ethyl methacrylate, hydroxyethyl methacrylate, n-butyl acrylate, isobutyl acrylate and 2-ethylhexyl acrylate; (meth)acrylates containing non-hydrocarbon groups such as glycidyl (meth)acrylate, tert-butylaminoethyl (meth)acrylate, and dimethylaminoethyl (meth)acrylate; alkyl maleates, such as monoethylmaleate and diethyl maleate; alkyl fumerates, such as monomethyl fumerate and dimethyl fumerate; and alkyl itaconates, such as monomethyl itaconate and diethyl itaconate.

In one embodiment, the at least one polymer may be graft-modified with esters of di- and polyacids and their salts (for example, metal salts, such as alkali metal salts, of the half, or partial, esters). Examples of suitable diacids include maleic acid, succinic acid and phthalic acid. Preferred maleates include dialkyl maleates, such as dimethyl, diethyl or dibutyl maleates. Polymers graft-modified with succinates and/or maleates generally have single succinate and/or maleate groups as the terminal or pendant groups on the polymer chain(s) of the graft-modified polymer. The succinate or maleate moieties may be unsubstituted or substituted. Grafted on acid ester may be present on the polymer chain as pendant and terminal acid ester groups. Pendant acid ester groups grafted onto the polymer may be distinguished from acid ester groups copolymerized into the polymer chain(s) by the at least two carbon atoms of a hydrocarbylene moiety connecting the closest carbonyl moiety of the acid to the polymer chain. Copolymerized acid ester groups are generally connected to the polymer chain by less than two carbon atoms from the closest carbonyl atom of the acid moiety. This difference can be detected using spectroscopic analysis, such as FTIR.

Processes for grafting of various acid esters onto various polymers are well known and described in the patent and technical literature (see, for example, U.S. Pat. No. 5,945,492). Grafting of methyl methacrylate and hydroxyethyl methacrylate onto polyolefins such as LDPE and EP is described, for example, in EP-A-33,220; grafting of hydroxyethyl methacrylate onto propylene polymers is described, for example, in U.S. Pat. No. 5,086,112; grafting of glycidyl methacrylate onto propylene polymers is described, for example, in U.S. Pat. No. 4,443,584 and U.S. Pat. No. 5,086,112. Graft-modification of LLDPE with dibutyl maleate is described, for example, in U.S. Pat. No. 3,267,173. Each of the aforementioned patents is incorporated herein by reference.

Diallyl acids, such as diallyl maleate, may also be used as a coagent for maleation of propylene polymers as described, for example, in U.S. Pat. No. 5,344,888, which is incorporated herein by reference.

Acid ester-modified polymers are commercially available from various sources. Acrylate-modified ethylene/vinyl acetate resins (Series 3100), for example, are available from DuPont under BYNEL™.

3. Acid Anhydride-Modified Polymers

Another suitable source of graft-modification is acid anhydrides, especially diacid anhydrides, and their salts (for example, metal salts, such as alkali metal salts). Examples of acid anhydrides are MAH, citraconic anhydride, itaconic anhydride, nadic anhydride, and himic anhydride.

In a preferred embodiment, at least one polymer is graft-modified with MAH. MAH graft-modified polymers generally have succinic anhydride and/or MAH, or oligomers thereof, as the terminal or pendant groups on the polymer chain(s) of the graft-modified polymer, which upon exposure to moisture may to some extent be reversibly converted to succinic acid and/or maleic acid, or oligomers thereof. The succinic anhydride or MAH moieties may be unsubstituted or substituted. The adjective "maleated" is used herein to indicate that the polymer has been graft-modified with maleic anhydride. The verb "maleation" is used herein to refer to grafting MAH onto a polymer.

Processes for maleation of polymers are well known and described in the patent and technical literature. Maleation of polyolefin polymers is described, for example, in U.S. Pat. No. 3,708,555; U.S. Pat. No. 3,868,433; U.S. Pat. No. 3,882,194; U.S. Pat. No. 4,506,056; U.S. Pat. No. 4,751,270; U.S. Pat. No. 4,762,890; U.S. Pat. No. 4,857,254; U.S. Pat. No. 4,857,600; U.S. Pat. No. 4,927,888; U.S. Pat. No. 4,950,541; U.S. Pat. No. 5,945,492, each of which is incorporated herein by reference.

In particular, maleation of propylene homopolymers is described in U.S. Pat. No. 3,414,551; U.S. Pat. No. 4,753,997; U.S. Pat. No. 4,824,736; U.S. Pat. No. 4,857,254; U.S. Pat. No. 5,001,197; U.S. Pat. No. 5,079,302; U.S. Pat. No. 5,344,886; U.S. Pat. No. 5,344,888; U.S. Pat. No. 5,945,492; U.S. Pat. No. 5,955,547; and U.S. Pat. No. 6,218,476, each of which is incorporated herein by reference. Maleation of propylene polymers is preferably carried out in the presence of styrene as the coagent as described, for example, in Labla et al., "Multiphase Polymers: Blends and Ionomers", ACS Symposium Series 395, Chapt. 3, pp 76-79 (1989). The pendant and/or terminal groups obtained via maleation using a styrene coagent may be referred to as "styrene-MAH" and are suitable for this invention.

Maleation of ethylene homopolymers, such as LDPE and HDPE, is described in U.S. Pat. No. 3,873,643; U.S. Pat. No. 4,639,495; U.S. Pat. No. 4,762,890; U.S. Pat. No. 4,788,264; U.S. Pat. No. 4,927,888; U.S. Pat. No. 4,987,190; and U.S. Pat. No. 5,945,492; maleation of ethylene-propylene copolymers is described in U.S. Pat. No. 5,001,197; U.S. Pat. No. 5,344,886; U.S. Pat. No. 5,344,888; U.S. Pat. No. 5,367,022; and U.S. Pat. No. 5,552,096; and maleation of ethylene/$C_3$-$C_{20}$ alpha-olefin interpolymers is described in U.S. Pat. No. 4,612,155; U.S. Pat. No. 4,739,017; U.S. Pat. No. 4,762,890; U.S. Pat. No. 4,857,254; U.S. Pat. No. 4,857,600; U.S. Pat. No. 4,927,888; U.S. Pat. No. 5,180,788; U.S. Pat. No. 5,346,963; and U.S. Pat. No. 5,705,565. Each of the foregoing patents is incorporated herein by reference.

Acid anhydride-modified polymers are commercially available from various sources. Anhydride-modified ethylene acrylate copolymers (Series 2100), anhydride-modified ethylene/vinyl acetate copolymers (Series 3000), anhydride-modified ethylene/vinyl acetate copolymers (Series 3800), anhydride-modified ethylene/vinyl acetate resins (Series 3900), anhydride-modified high density polyethylene resins (Series 4000), anhydride-modified linear low density polyethylene resins (Series 4100), anhydride-modified low density polyethylene resins (Series 4200), and anhydride-modified polypropylene resins (Series 5000) are available from DuPont under BYNEL™. Maleated LLDPE is also available from Quantum Chemical Corporation, Cincinnati, Ohio, U.S.A. under PLEXAR®, such as PLEXAR® PX360, 3741 and 3779, from DSM under YPAREX™, such as YPAREX™ 8104E; and from Morton International; Chicago, Ill., U.S.A, under TYMOR®, such as TYMOR® 1203. Maleated polypropylene resins are also available from Quantum Chemical Corporation, Cincinnati, Ohio, U.S.A. under PLEXAR®, such as PLEXAR® 360, from Montell under QUESTRON™, such as QUESTRON™ KA 805, from Mitsubishi Chemical Corporation under ADMER™, such as ADMER™ QF305 and ADMER™ QF500, from Elf Atochem under OREVAC™, such as PP-FT or PP-C, from Montell USA Inc. under HERCOPRIME™, such as HERCOPRIME™ HG201 or G211, and from Eastman Chemicals under EPOLENE™, such as EPOLENE™ E43, G3003 and G3015.

B2) Composition of Polymer Matrix B)

The polymer matrix for making the cellular thermoplastic foam comprises at least one polymer resin comprising multiple polymer molecules graft-modified with, on the average, at least one polar group according to the above description of graft-modification. The polymer matrix may comprise one polymer or several different polymers in admixture, such as in a blend, with each other.

When more than one polymer is present in the polymer matrix, the polymer matrix may comprise (1) one or more polymer resins comprising multiple polymer molecules graft-modified with, on the average, at least one polar group per above ("first category") combined with (2) one or more different polymer resins which are not graft-modified, graft-modified to a different degree, or graft-modifed with different polar groups ("second category"). In a preferred embodiment, the at least one first category polymer resin comprises at least one polymer resin that has, on the average, at least one, preferably at least two, polar groups per resin molecule and the at least one second category polymer resin has, on the average, less than one, more preferably less than 0.1, and even more preferably less than 0.01, and even more preferably zero, polar group per polymer resin molecule.

In a preferred embodiment, the polymer resin comprises at least one polyolefin resin, especially a thermoplastic polyolefin resin. The at least one polyolefin resin preferably comprises at least one ethylene polymer, at least one propylene polymer, or a mixture of at least one ethylene polymer with at least one propylene polymer. At least one polyolefin resin preferably has on the average less than one, more preferably less than 0.1, and more preferably less than 0.01, and even more preferably zero, polar group per polymer resin molecule.

In the case of combinations of polymer resins, the polymer resins are preferably in the form of a blend. To form such blends, the polymer resins preferably have similar melt flow rates measured according to ASTM D1238, which unless stated otherwise is measured under a force applied by 2.16 kg,. The ratio of the melt flow rate of the polymer resin having the lowest melt flow rate to the melt flow rate of the polymer resin having the highest melt flow rate is preferably at least 1:20, more preferably at least 1:10, even more preferably at least 1:4, and even more preferably at least 1:3, and even more preferably at least 1:2 and preferably up to 20:1, more preferably up to 10:1, and even more preferably up to 3:1. When the combination of polymer resins is a mixture of at least one ethylene polymer with at least one propylene polymer, the ratio of the melt index of the ethylene polymer to the melt flow rate of the propylene polymer is preferably at least 1:4, more preferably at least 1:3, and even more preferably at least 1:2, and preferably up to 20:1, more preferably up to 10:1, and even more preferably up to 3:1.

The polymer matrix preferably comprises at least 0.01, more preferably at least 0.05, more preferably at least 0.1, and even more preferably at least 1, weight-percent polar groups and preferably up to 20, more preferably up to 10, and even more preferably up to 6, weight-percent polar groups. In a preferred embodiment, the polymer matrix comprises a combination of polymer resins wherein at least one, more preferably one, of the polymer resins has a weight-percent amount of polar groups within the above weight-percent ranges. In the latter case, the polymer resins having polar groups preferably comprise at least 0.5, more preferably 1, and even more preferably 2, weight-percent, and preferably up to 20, more preferably up to 10, and even more preferably up to 5, weight-percent, based on the total weight of the polymer resins in the polymer matrix.

The polymer resin material is combined with the particulate additive to form the polymer matrix. The particulate additive is preferably mixed with the polymer resins until the particulate additive is homogeneously dispersed in the polymer resin material. In the preferred polymer matrix comprising a combination of polymer resins, the particulate additive is first combined, preferably admixed, with at least one polymer resin grafted with polar groups in one of the preferred amounts, such as the amounts preferred for the first category polymer resins described above, to form a concentrate, which is then combined, preferably blended, with at least one, preferably more than one, polymer resin of the polymer matrix which contains a lower ratio of, or zero, polar groups per polymer molecule, such as one or more of the second category polymer resins described above.

The weight-ratio of the polymer resins having polar groups to the particulate additive is preferably at least 0.1:1, more preferably at least 0.25:1, and even more preferably at least 0.5:1, and preferably up to 5:1, more preferably up to 2:1, and even more preferably up to 1:1. The total amount of particulate additive in the polymer matrix is preferably at least 0.5, more preferably 1, and even more preferably 2, weight-percent, and preferably up to 10, more preferably up to 7, and even more preferably up to 5, weight-percent, based on the total weight of the polymer resins in the polymer matrix.

C) Organic Flame Retardant

The foams of the invention preferably include an organic flame retardant not included, but rather in addition to, the above particulate additives A), which functions to slow or minimize the spread of fire in the foam. The flame retardant is preferably a halogen-containing compound or mixture of compounds which imparts flame resistance to the foams of the present invention.

The term "halo" or "halogenated" includes compounds containing bromine, chlorine, or fluorine, or any combination thereof. Preferably, the flame retardant is a bromine or chlorine-containing compound. They may be halogenated aromatic or alkane compounds.

Suitable aromatic halogenated flame retardants are well-known in the art and include but are not limited to hexahalodiphenyl ethers, octahalodiphenyl ethers, decahalodiphenyl ethers, decahalodiphenyl ethanes; 1,2-bis (trihalophenoxy)ethanes; 1,2-bis(pentahalophenoxy) ethanes; a tetrahalobisphenol-A; ethylene(N,N')-bis-tetrahalophthalimides; tetrabromobisphenol A bis(2,3-dibromopropyl ether); tetrahalophthalic anhydrides; hexahalobenzenes; halogenated indanes; halogenated phosphate esters; halogenated polystyrenes; and polymers of halogenated bisphenol-A and epichlorohydrin, and mixtures thereof. Preferred aromatic halogenated flame retardants may include one or more of tetrabromobisphenol-A (TBBA), tetrabromo bisphenol A bis(2,3-dibromopropyl ether), decabromodiphenyl ethane, brominated trimethylphenylindane, or aromatic halogenated flame retardants with similar kinetics.

Suitable halogenated alkane compounds may be branched or unbranched, cyclic or acyclic. Preferably, the halogenated alkane compound is cyclic. Suitable halogenated alkane flame retardants include and are not limited to hexahalocyclododecane; tetrabromocyclooctane; pentabromochlorocyclohexane; 1,2-dibromo-4-(1,2-dibromoethyl)cyclohexane; 1,1,1,3-tetrabromononane; and mixtures thereof. Preferred halogenated alkane flame retardant compounds include hexabromocyclododecane and its isomers, pentabromochlorocyclohexane and its isomers, and 1,2-dibromo-4-(1,2-dibromoethyl)cyclohexane and its isomers. Hexabromocyclododecane (HBCD), and halogenated alkane flame retardants with similar kinetics are preferred.

Commercially available products suitable for use as flame retardants in the present invention include PE-68™ (a trademark and product of the Great Lakes Chemical Corporation). Suitable flame retardants are well known, and include brominated organic compounds such as are described in U.S. Pat. No. 4,446,254 and U.S. Pat. No. 5,171,757, which are incorporated herein by reference. For foams, the halogen content provided by the halogenated flame retardants in the final foams should be 0.05-20 phr, preferably 0.1-15 phr and most preferably 0.5-15 phr.

The polymeric resin compositions preferably include at least about 0.5 phr halogenated flame retardant, more preferably at least about 0.8 phr, preferably up to about 12 phr, more preferably up to about 6 phr halogenated flame retardant. The parts per hundred parts of resin ("phr") are based on the total parts by weight of polymer in the flame retardant-containing composition.

In a preferred embodiment, the flame retardant is a hexahalocyclododecane, preferably hexabromocyclododecane (HBCD), or tetrabromobisphenol A bis(2,3-dibromopropyl ether), PE™-68, or a combination with any other halogenated or non-halogenated flame-retardants, which can include, but are not limited to phosphorous based flame retardants such as triphenyl phosphate and encapsulated red phosphorous.

In a preferred embodiment, the flame retardant is a mixture of at least two different types of flame retardants that may be added together or separately into a polymer resin composition. A mixture that includes both a halogenated alkane compound and an aromatic halogenated compound has been found to enhance blending of α-olefin polymers with alkenyl aromatic polymers which are described in more detail under separate headings below, and this combination tends to reduce the density of foams made from that mixture. The ratio of aromatic halogenated flame retardant to halogenated alkane flame retardant in parts by weight for that purpose is preferably from about 16:1 to 1:16, more preferably from about 7.5:1 to 1:7.5, and most preferably about 5:1 to 1:5. The concentration of aromatic halogenated flame retardant is preferably at least about 0.5 parts by weight per hundred parts by weight (phr) of the α-olefin polymer component, more preferably at least 1 phr, and preferably up to 8 phr based on the weight of the α-olefin polymer component. The concentration of halogenated alkane flame retardant is preferably at least about 0.5 parts by weight per hundred parts by weight (phr) of the alkenyl aromatic polymer component, more preferably at least 1 phr, and preferably up to 8 phr based on the weight of the alkenyl aromatic polymer component. In a preferred embodiment, the flame retardant mixture includes a combination of hexahalocyclododecane such as hexabromocyclododecane (HBCD), and tetrabromobisphenol A bis(2,3-dibromopropyl ether).

The organic flame retardants C) are preferably combined with the above-described flame retardant adjuvant. Combinations of organic flame retardants C) with the above-described flame retardant synergists are particularly preferred.

Synergistic combinations, such as mixtures of one or more halogenated compounds and one or more flame retardant synergists, typically are used preferably at a ratio of 0.25 to 25, preferably 0.5 to 15, more preferably from 0.5 to 12 parts by weight flame retardant halogen to 1 part by weight of flame retardant synergist. In the case of an antimony-containing synergist, the ratio of halogen contained in the halogenated flame retardant to antimony contained in the flame retardant synergist is preferably in the range from 1 to 7 moles, more preferably 1 to 6 moles, and even more preferably 1 to 4 moles, halogen contributed by the flame retardant per one mole antimony contributed by the flame retardant synergist.

D) Stability Control Agent or Cell Size Enlarging Agent

A stability control agent or cell size enlarging agent is optionally added to the present foam to enhance dimensional stability. Preferred agents include amides and esters of $C_{10-24}$ fatty acids. Such agents are seen in U.S. Pat. No. 3,644,230 and U.S. Pat. No. 4,214,054, which are incorporated herein by reference. Most preferred agents include stearyl stearamide, glycerol monostearate (available from ICI Americas Inc., under the trademark Atmer™ 129), glycerol monobehenate, and sorbitol monostearate. Typically, such stability control agents are employed in an amount ranging from 0.1 to 10 phr.

E) Other Additives

The foam of the present invention may optionally contain one or more conventional additives different from, and in addition to, the above-described additives to the extent that they do not interfere with the desired foam properties. Typical additives include organic flame retardant synergists, such as dicumyl(dimethyldiphenylbutane), poly(1,4-diisopropyl-benzene), halogenated paraffin, triphenylphosphate, and mixtures thereof, antioxidants such as hindered phenols and phosphites (for example, IRGANOX™ 1010 and IRGAFOS™ 168, respectively, each a trademark of and available from the Ciba Geigy Corporation), ultraviolet stabilizers such as hindered amine light stabilizers (for example TINUVIN™ 770, which is a trademark of and available from the Ciba Geigy Corporation), cling additives (for example, polyisobutylene), organic colorants, and extrusion aids.

Preparation of Foams

The foam structure of the invention may be prepared by conventional extrusion foaming processes. This process generally entails feeding the ingredients of the polymeric resin composition together or separately into the heated barrel of an extruder, which is maintained above the crystalline melting temperature or glass transition temperature of the constituents of the polymeric resin composition; heating the polymeric resin composition to form a plasticized or melt polymer material; incorporating a blowing agent into the melt polymer material to form a foamable gel; and expanding the foamable gel to form the foam product. The foamable gel may be extruded or conveyed through a die of desired shape to an area of lower pressure where the mixture expands to form a cellular foam structure. The lower pressure is preferably at an atmospheric level. Typically, the mixture is cooled to within +/−20° C. of the highest crystalline melting point or glass transition temperature of the components of the polymeric resin composition before extrusion in order to optimize physical characteristics of the foam.

Processes for making polyolefin foam structures are described in C. P. Park. "Polyolefin Foam", Chapter 9, Handbook of Polymer Foams and Technology, edited by D. Klempner and K. C. Frisch, Hanser Publishers, Munich, Vienna, New York, Barcelona (1991) and in WO 00/15697; WO 00/15700; WO 01/70860; WO 01/70861; and WO 01/70479, which are incorporated herein by reference.

A preferred process involves using a low die pressure for extrusion which is greater than the prefoaming critical die pressure but only as high as four times, more preferably three times, even more preferably two times, the prefoaming critical die pressure. The prefoaming critical die pressure is best determined experimentally for formulations comprising not only the polymer components but also additional additives such as flame retardants, synergists and cell enlarging agents. This is typically accomplished by preparing foams at several prefoaming die pressures and determining the effect of changes in the die pressure on the foam cell size and appearance. Below the prefoaming critical die pressure, the quality of the foam deteriorates sharply, rough skin is observed on the foam due to rupture of surface cells and typically a crackling noise is heard at the die due to rapid degassing of the blowing agent. At too high die pressures, the foam tends to nucleate significantly causing a loss in cell size upper limit which typically corresponds to a value of up to four times, the prefoaming critical die pressure.

In a preferred embodiment of the present invention, the resulting foam structure is optionally formed in a coalesced strand form by extrusion of the foamable gel through a multi-orifice die. The orifices are arranged so that contact between adjacent streams of the molten extrudate occurs during the foaming process and the contacting surfaces adhere to one another with sufficient adhesion to result in a unitary foam structure. The streams of molten extrudate exiting the die take the form of strands or profiles, which desirably foam, coalesce, and adhere to one another to form a unitary structure. Desirably, the coalesced individual strands or profiles should remain adhered in a unitary structure to prevent strand delamination under stresses encountered in preparing, shaping, and using the foam. Apparatuses and method for producing foam structures in coalesced strand form are seen in U.S. Pat. No. 3,573,152 and U.S. Pat. No. 4,824,720, both of which are incorporated herein by reference.

Alternatively, the resulting foam structure is conveniently formed by an accumulating extrusion process as seen in U.S. Pat. No. 4,323,528, which is incorporated by reference herein. In this process, low density foam structures having large lateral cross-sectional areas are prepared by: 1) forming under pressure the foamable gel from a polymeric resin composition and a blowing agent at a temperature at which the viscosity of the gel is sufficient to retain the blowing agent when the gel is allowed to expand; 2) extruding the gel into a holding zone maintained at a temperature and pressure which does not allow the gel to foam, the holding zone having an outlet die defining an orifice opening into a zone of lower pressure at which the gel foams, and an openable gate closing the die orifice; 3) periodically opening the gate; 4) substantially concurrently applying mechanical pressure by a movable ram on the gel to eject it from the holding zone through the die orifice into the zone of lower pressure, at a rate greater than that at which substantial foaming in the die orifice occurs and less than that at which substantial irregularities in cross-sectional area or shape occurs; and 5) permitting the ejected gel to expand unrestrained in at least one dimension to produce the foam structure.

Blowing agents useful in making the resulting foam structure include inorganic agents, organic blowing agents and chemical blowing agents. Suitable inorganic blowing agents include carbon dioxide, nitrogen, argon, water, air, nitrogen, and helium. Organic blowing agents include aliphatic hydrocarbons having 1-9, preferably 1-6, carbon atoms, aliphatic alcohols having 1-3 carbon atoms, and fully and partially halogenated aliphatic hydrocarbons having 1-4 carbon atoms. U.S. Pat. No. 6,048,909 to Chaudhary et al. discloses a number of suitable blowing agents at column 12, lines 6-56, the teachings of which are incorporated herein by reference. Preferred blowing agents include aliphatic hydrocarbons having 1-9 carbon atoms, especially propane, n-butane and isobutane, more preferably isobutane.

The amount of blowing agent incorporated into the polymer melt material to make a foamable gel is preferably from 0.2 to 5.0, more preferably from 0.5 to 3.0, and even more preferably from 1.0 to 2.50 gram moles per kilogram of polymer. However, these ranges should not be taken to limit the scope of the present invention.

The foam is conveniently extruded in various shapes having a preferred foam thickness in the direction of minimum foam thickness in the range from about 1 mm to about 100 mm or more. When the foam is in the form of a sheet, the foam preferably has a thickness in the range from about 1 or 2 mm to about 15 mm. When the foam is in the form of a plank, the foam preferably has a thickness in the range from about 15 mm to about 100 mm. The desired thickness depends in part on the application.

When the foam of this invention is a thick sheet or plank, the foam desirably has perforation channels. Thick polymer foams may have an average thickness perpendicular to the surface perforated of at least about 25 millimeters (mm) and the polymer foam may be preferably perforated to an average depth of at least 5 mm below the surface of the polymer foam. Typically, perforation comprises puncturing the base foam. A description of how to create suitable perforation channels to accelerate release of blowing agent from the foam is provided in U.S. Pat. No. 5,585,058, which is incorporated herein by reference. Accelerated aging of the foam to remove blowing agent may also be achieved, for example, by perforation techniques and heat aging as described in U.S. Pat. No. 5,242,016 and U.S. Pat. No. 5,059,376, which are also incorporated herein by reference. Perforation of macrocellular foams to improve acoustic performance of thermoplastic foams is described in WO 00/15697, which is also incorporated herein by reference.

The foam of this invention preferably has perforation channels, more preferably a multiplicity of perforation channels extending from the at least one surface into the foam such that there is an average of at least one, preferably at least 5, more preferably at least 10, even more preferably at least 20, and even more preferably at least 30, perforation channel(s) per 10 square centimeters ($cm^2$) area of the at least one surface. The term "multiplicity" as used herein means at least two. In a preferred embodiment, the foam of this invention contains at least seven perforation channels.

The perforation channels preferably have an average diameter at the at least one surface of at least 0.1 mm, more preferably at least 0.5 mm, and even more preferably at least 1 mm and preferably up to about the average cell size of the foam measured according to ASTM D3756. One or more surfaces of the foam preferably has an average of at least four perforation channels per square centimeter extending from the at least one surface into the foam.

The polymer foam preferably has an average thickness perpendicular to the surface perforated of at least 25 mm and the polymer foam is preferably perforated to an average depth of at least 5 mm below the surface of the polymer foam.

Typically, perforation comprises puncturing the base foam with one or more pointed, sharp objects. Suitable pointed, sharp objects include needles, spikes, pins, or nails. In addition, perforation may comprise drilling, laser cutting, high pressure fluid cutting, air guns, or projectiles.

In addition, the base foam may be prepared to have elongated cells by pulling the foam during expansion. Such pulling results in elongated cells without changing or often, increasing the cell size in the horizontal direction. Thus, pulling results in an increased average cell size in the direction perpendicular to the vertical direction (EH average) and facilitates perforation.

Perforation of the base foam may be performed in any pattern, including square patterns and triangular patterns. Although the choice of a particular diameter of the sharp, pointed object with which to perforate the base foam is dependent upon many factors, including average cell size, intended spacing of perforations, pointed, sharp objects useful in the preparation of certain foams of the present invention will typically have diameters of from 1 mm to 4 mm.

Compression may be used as an additional means of opening cells. Compression may be performed by any means sufficient to exert external force to one or more surfaces of the foam, and thus cause the cells within the foam to burst. Compression during or after perforation is especially effective in rupturing the cell walls adjacent to the channels created by perforation since a high pressure difference across the cell walls can be created. In addition, unlike needle punching, compression can result in rupturing cell walls facing in all directions, thereby creating tortuous paths desired for sound absorption.

The mechanical opening of closed-cells of the base foam lowers the airflow resistivity of the base foam by creating large-size pores in the cell walls and struts. In any event, regardless of the particular means by which it does so, such mechanical opening of closed-cells within the base thermoplastic polymer foam serves to enhance the usefulness of the foam for sound absorption and sound insulation applications.

Of course, the percentage of cells opened mechanically will depend on a number of factors, including cell size, cell shape, means for opening, and the extent of the application of the means for opening applied to the base foam.

The resulting foam structure preferably exhibits good dimensional stability. Preferred foams recover 80 or more percent of initial volume within a month with initial volume being measured within 30 seconds after foam expansion. Volume is measured by a suitable method such as cubic displacement of water.

In one embodiment, the foam structure may be substantially cross-linked. Cross-linking may be induced by addition of a cross-linking agent or by radiation. Induction of cross-linking and exposure to an elevated temperature to effect foaming or expansion may occur simultaneously or sequentially. If a cross-linking agent is used, it is incorporated into the polymer material in the same manner as the chemical blowing agent. Further, if a cross-linking agent is used, the foamable melt polymer material is heated or exposed to a temperature of preferably less than 150° C. to prevent decomposition of the cross-linking agent or the blowing agent and to prevent premature cross-linking. If radiation cross-linking is used, the foamable melt polymer material is heated or exposed to a temperature of preferably less than 160° C. to prevent decomposition of the blowing agent. The foamable melt polymer material is extruded or conveyed through a die of desired shape to form a foamable structure. The foamable structure is then cross-linked and expanded at an elevated or high temperature (typically, 150° C.-250° C.) such as in an oven to form a foam structure. If radiation cross-linking is used, the foamable structure is irradiated to cross-link the polymer material, which is then expanded at the elevated temperature as described above. The present structure can advantageously be made in sheet or thin plank form according to the above process using either cross-linking agents or radiation.

Crosslinked acoustically active thermoplastic macrocellular foams and methods for manufacturing them are described in more detail in WO 00/15700, which is incorporated herein by reference.

The present foam structure may also be made into a continuous plank structure by an extrusion process utilizing a long-land die as described in GB 2,145,961A. In that process, the polymer, decomposable blowing agent and cross-linking agent are mixed in an extruder, heating the mixture to let the polymer cross-link and the blowing agent to decompose in a long-land die; and shaping and conducting away from the foam structure through the die with the foam structure and the die contact lubricated by a proper lubrication material In a preferred embodiment of the present invention, the macrocellular thermoplastic polymer foams have less than 35 percent crosslinking after 10 days aging. The resulting foam structure more preferably has not more than 30 percent crosslinking, even more preferably less than 20 percent crosslinking, and even more preferably less than 10 percent crosslinking, after 10 days aging. The foam of this invention is even more preferably substantially noncrosslinked or uncrosslinked and the polymer material comprising the foam structure is preferably substantially free of crosslinking.

The resulting foam structure may be either closed-celled or open-celled. The open cell content will range from 0 to 100 volume-percent as measured according to ASTM D2856-A. In one embodiment, the foam structure has an open cell content not greater than 30 volume-percent, more preferably not greater than 20 volume-percent, measured according to that ASTM method.

The resulting foam structure preferably has a density of less than 300, preferably less than 100, more preferably less than 60 and most preferably from 10 to 50 kilograms per cubic meter.

The macrocellular foams exhibit an average cell size of at least 1.5 mm, preferably 2 mm, more preferably at least 3 mm, even more preferably at least 4 mm, preferably up to 20 mm, 15 mm and 10 mm also being preferred, according to ASTM D3575.

Properties and End Uses

Applications for the macrocellular flame resistant acoustic compositions of the present invention include articles made by all the various extrusion processes. Such articles may be used in automotive and other transportation devices, building and construction, household and garden appliances, power tool and appliance and electrical supply housing, connectors, and aircraft as acoustic systems for sound absorption and insulation. The materials are especially suited to applications where, in addition to meeting the relevant acoustic performance standards, they must also meet any applicable fire test codes, for example office partitions, automotive decouplers, domestic appliance sound insulation, and sound proofing panels and machine enclosures. The ability to pass the US FMVSS 302 (auto) test, have a US Underwriter's Laboratory UL 94 rating of HF1, and a B1 rating under German norm DIN 4102 are some of the goals that may be achieved with the present invention.

The foams of the present invention have excellent acoustic absorption capabilities. One way to measure the ability to absorb sound is to measure the acoustic absorption coefficient of the foam according to ASTM E1050 at sound frequencies of 250, 500, 1000 and 2000 Hz and then calculate the arithmetic average of those sound absorption coefficients. When that determination is made with the foams of the present invention, the average sound absorption coefficient is greater than 0.15, preferably greater than 0.20, more preferably greater than 0.25, even more preferably greater than 0.30. Thus the foams of this invention are useful for absorbing sound in the range from 250 to 2000 Hz such that the sound absorption capability is equivalent to the foregoing preferred average sound absorption coefficients. For example, the foam may be located in the presence of a sound intensity of at least 50 decibels, such as on a vehicle equipped with a combustion engine. Unexpectedly, foams of the present invention have a peak absorption coefficient of at least 0.5 within a frequency range of 250 to 1000 Hz for foams having a thickness within a range of from 10 nm to 100 mm.

Another advantage of the foam of the present invention is that the high average sound absorption coefficient may be achieved with a low water absorption. That is desirable to help limit corrosion of proximate metal parts, to avoid the growth of bacteria and mold, and to improve thermal insulation value where that is needed. The inventive foam preferably does not absorb more than 10 percent water by volume, 5 percent water by volume, 3 percent water by volume, more preferably not more than 1.5 percent water by volume, and even more preferably not more than 1 percent water by volume, when measured according to European Norm (EN) 12088 at a 50° C. temperature gradient between a warm, water-saturated atmosphere and the foam (the latter of which is maintained at a temperature at or below about 0° C. in order to condense the water onto the surface of the foam sample) based on a test period of 14 days exposure.

The foregoing list merely illustrates a number of suitable applications. Skilled artisans can readily envision additional applications without departing from the scope or spirit of the present invention.

The following examples illustrate, but do not in any way limit the scope of the present invention.

EXAMPLES

Materials Used to Prepare the Foams of the Examples:
1. LDPE 620i is a low density polyethylene (LDPE) with a density of 0.924 g/cc and melt index of 1.8 dg/min (according to ASTM D1238, 190° C./2.16 kg) available from the Dow Chemical Company.
2. PROFAX™ PF814 is a high melt strength polypropylene (HIMS PP) with a melt index of 3 dg/min (according to ASTM D1238, 230° C./2.16 kg) available from Montell Polyolefins.
3. TRUTINT™ 50 is antimony trioxide synergist, Sb2O3, of average particle size of 3.0 microns, respectively (used as an 80% concentrate in LDPE 620i) and is a trademark of and available from the Great Lakes Chemical Corporation.
4. MICROFINE™ AO-3 is antimony trioxide ($Sb_2O_3$) synergist having an average particle size of 0.3 microns (used as an 80% concentrate in LDPE 620i) and is a trademark of and available from the Great Lakes Chemical Corporation.
5. BYNEL™ 4206 is MAH-modified LDPE having a melt index of 2.5 dg/10 min. (according to ASTM D 1238, 190° C./2.16 kg), a melting point of 102 degrees Celsius, and a Vicat softening point of 75 degrees Celsius (according to ASTM D 1525), available from E.I. du Pont de Nemours, Wilmington, Del.
6. FP Black D29045 PEC is 50 weight-percent carbon black in LDPE 620i available from Technical Polymer Representatives, Inc.
7. PE-68™ is a brominated fire retardant having 68 wt % bromine content (tetrabromobisphenol A bis(2,3-dibromopropyl ether) as a 30% concentrate in LDPE 620i). It is a trademark of, and available from, the Great Lakes Chemical Corporation.
8. SAYTEX™ HP-900 is hexabromocyclododecane (HBCD), a brominated fire retardant containing about 75 wt % bromine. It is a trademark of and available from the Albemarle Corporation.
9. ATMER™ 129 is glycerol monostearate (GMS), a permeability modifier/cell size enlarger, (used as an 10% concentrate in LDPE 620i) and is a trademark of and available from ICI Americas.
10. IRGANOX™ 1010 is a phenolic antioxidant/stabilize. It is a trademark of and available from Ciba Specialty Chemicals
11. ULTRANOX™ 626 is a phosphite antioxidant/stabilizer and is a trademark of, and available from, GE Specialty Chemicals Tests for the examples below were conducted by extruding the formulations specified in the respective Tables 1 to 3 on an extrusion line. The extrusion line consists of a twin screw extruder with feeding zones for resins and solid additives, melting zones, and metering zones. In addition, there are mixing zones with ports for injecting blowing agents and liquid additives and a cooling zone to uniformly cool the melt to the foaming temperature. The foaming temperature is the optimal gel temperature for foaming when the melt strength is high enough to stabilize the foam and prevent cell collapse. The line also consists of a gear pump between the metering and mixing zones to stabilize the melt flow and a static mixer in the cooling zone to aid in gel temperature uniformity. The melt is extruded through a die to ambient temperature and pressure to expand the gel to the desired shape and stabilize the foam.

Example 1

The formulations shown in Table 1 below are run on a twin screw extrusion line maintained at polyethylene processing conditions. In each run, the foaming temperature is 110° C. and the pressure at the die is maintained within the range of 250-300 psi (17-21 bar or 1.72-2.07 MPa). The levels of the additives used in the formulation (irrespective of whether they are fed as powders or as concentrates) are reported on an active basis in phr (parts by weight per hundred parts by weight of polymer). The level of blowing agent used in the formulation is reported in pph (parts by weight per hundred parts by weight total feed, that is polymer and additives).

For Formulation 1 according to this invention, a concentrate is prepared by separately and preliminarily combining 10 parts by weight of the TRUTINT™ 50 antimony trioxide concentrate with 8 parts by weight of the BYNEL™ 4206 maleated LDPE in 20 parts by weight of LDPE 620i in a twin screw compounder under the same temperature pressure conditions as for making the foams stated above. The concentrate is introduced into the same extruder used to make the foams with Formulation Control 1 and Formulation Comparative 1 to provide the parts per hundred parts by weight resin (pph) of TRUTINT™ 50 and BYNEL™ 4206 specified in Table 1 for Formulation 1. Since the concentrate contributes to the total LDPE 620i, the balance of the LDPE 620i introduced into the latter extruder to make the foam of Formulation 1 is reduced to maintain a total LDPE 620i rate of 100 pph.

The average cell size of the respective foams made with each formulation is shown in Table 1.

As can be seen from the data in Table 2, when the concentrate containing BYNEL™ 4206 is purged in, the cell size of the foam increased from 6.5 mm to 8.0 mm, representing a 23 percent increase relative to the comparative FR formulation containing untreated MICROFINE™ AO-3 antimony trioxide. The larger cell size improves acoustic performance, especially in the low frequency range, such as at 250 and 500 hertz (Hz).

Example 3

The formulations shown in Table 3 below are run on a twin screw extrusion line maintained at polypropylene processing conditions. In each run, the foaming temperature is 147° C. and the pressure at the die is maintained within the range of 350400 psi (24-28 bar or 2.41-2.76 MPa).

In this case, BYNEL™ 4206 maleated LDPE is not first combined with MICROFINE™ AO-3 as in Examples 1 and 2. Instead, it is added directly to the extruder used make the foam to treat the MICROFINE™ AO-3 in situ directly within that extruder.

The average cell size of the respective foams made with each formulation is shown in Table 3.

TABLE 1

| Formulation* | SAYTEX™ HP-900 | PE-68™ | TRUTINT™ 50 | BYNEL™ 4206 | Average cell size |
|---|---|---|---|---|---|
| Control 1 | 0 pph | 0 pph | 0 pph | 0 pph | 10.0 mm |
| Comparative 1 | 6 pph | 3 pph | 3 pph | 0 pph | 2.8 mm |
| 1 | 6 pph | 3 pph | 3 pph | 3 pph | 7.5 mm |

*Other ingredients in each Run formulation: PE 620i: 100 pph; Irganox™ 1010: 0.3 phr; Atmer 129: 0.5 phr; isobutane as blowing agent: 9 pph As can be seen from the data in Table 1, when the concentrate containing BYNEL™ 4206 is purged in, the cell size of the foam increased from 2.8 mm to 7.5 mm, representing a 168% increase relative to the comparative fire retardant (FR) formulation containing untreated TRUTINT™ 50 antimony trioxide. Larger cell size provides improved acoustic performance.

Example 2

The formulations shown in Table 2 below are run on a twin screw extrusion line under the same conditions as in Example 1. For Formulation 2 according to this invention, a concentrate is prepared in the same way as in Example 1, except that MICROFINE™ AO-3 antimony trioxide is substituted for TRUTINT™ 50.

The average cell size of the respective foams made according to each run is shown in Table 2.

TABLE 2

| Formulation* | SAYTEX™ HP-900 | PE-68™ | MICROFINE™ AO-3 | BYNEL™ 4206 | Average cell size |
|---|---|---|---|---|---|
| Control 2 | 0 pph | 0 pph | 0 pph | 0 pph | 10.0 mm |
| Comparative 2 | 6 pph | 3 pph | 3 pph | 0 pph | 6.5 mm |
| 2 | 6 pph | 3 pph | 3 pph | 3 pph | 8.0 mm |

*Other ingredients in each Run formulation: PE 620i: 100 pph; Irganox™ 1010: 0.3 phr; Atmer 129: 0.5 phr; isobutane as blowing agent: 9 pph

TABLE 3

| Formulation* | PE-68™ | MICROFINE™ AO-3 | BYNEL™ 4206 | Average cell size |
|---|---|---|---|---|
| Control 3 | 0 pph | 0 pph | 0 pph | 9.5 mm |
| Comparative 3 | 5 pph | 2.5 pph | 0 pph | 8.8 mm |
| 3 | 5 pph | 2.5 pph | 3.2 pph | 10.1 mm |

*Other ingredients in each Run formulation: PROFAX™ PF-814 HMS PP: 60 pph; PE-620i LDPE: 40 pph; IRGANOX™ 1010: 0.5 phr; ULTRANOX™ 626: 0.2 phr; ATMER 129GMS: 0.5 phr; FP Black D29045 PEC: 0.375 phr; and isobutane as blowing agent: 8 pph As can be seen from the data in Table 3, when the concentrate containing BYNEL™ 4206 is purged in, the cell size of the foam increased from 8.8 mm to 10.1 mm, representing a 15 percent increase relative to the comparative fire retardant (FR) formulation containing untreated MICROFINE™ AO-3 antimony trioxide. The larger cell size improves acoustic performance, especially in the low frequency range such as at 250 and 500 hertz (Hz).

In addition, Comparative Formulation 3 produces a foam having extremely small cells at the skin surface of the extruded and expanded foam (the surfaces that come in contact with the die during extrusion). When maleated LDPE is added in Formulation 3 according to the invention, the cell size at the skin surface increases substantially. This results in a further improved acoustic performance of the foam having the skin layer due to the presence of large cells at the surface which is exposed to acoustic vibrations.

What claimed is:

1. A macrocellular polymer foam having an average cell size, measured according to ASTMD3575, of at least 1.5 mm and a density less than 100 kilograms per cubic meter comprising:
   A) at least one particulate additive in admixture with
   B) a polymer matrix,
wherein the polymer matrix comprises at least one polymer resin graft-modified with at least one polar group selected from the group consisting of acid, acid ester, or acid anhydride, or a salt thereof.

2. The foam of claim 1, wherein the acid of the acid, acid ester, or acid anhydride, or salt thereof, is a mono-unsaturated carboxylic acid.

3. The foam of claim 1, wherein the acid is acrylic acid and the acid anhydride is maleic anhydride.

4. The foam of claim 3; wherein the polymer resin graft-modified with at least one polar group has at least one pendant polar group selected from the group consisting of poly(acrylic acid), methyl acetate, succinic acid and maleic anhydride.

5. The foam of claim 1; wherein the polymer matrix B) comprises at least one polyolefin resin.

6. The foam of claim 5, wherein the at least one polyolefin resin is at least one ethylene polymer or at least one propylene polymer, or a mixture of at least one ethylene polymer and at least one propylene polymer, the ethylene polymer being an ethylene homopolymer or an interpolymer of ethylene and at least one monomer selected from the group consisting of one or more $C_3$-$C_{10}$ α-olefin polymers, and the propylene polymer being a propylene homopolymer or an interpolymer of propylene with ethylene or one or more $C_3$-$C_{10}$ α-olefin polymers.

7. The foam of claim 1, wherein the particulate additive comprises a metal oxide, halide, borate, silicate, or stannate.

8. The foam of claim 1, wherein the particulate additive is a flame retardant adjuvant selected from the group consisting of a flame retardant synergist, a smoke suppressant or char forming agent, flame retardant, antioxidant, antiblock additive, colorant, pigment, filler, or acid scavenger.

9. The foam of claim 8, wherein the particulate additive comprises an antimony oxide flame retardant synergist.

10. The foam of claim 1, wherein the at least one polymer resin of the polymer matrix B) comprises at least one first-category polymer resin that has, on the average, at least one polar group per resin molecule and at least one second-category polymer resin that has, on the average, less than 0.1 polar group per polymer resin molecule.

11. The foam of claim 10, wherein the at least one second-category polymer resin is an ethylene polymer or a propylene polymer, or a mixture of an ethylene polymer and a propylene polymer.

12. The foam of claim 10, wherein the ratio of the average melt flow rate of the first-category polymer resin(s) to the average melt flow rate of the second-category polymer resin(s), each melt flow rate measured according to ASTM D1238 (2.16 kg,.), is in the range from 1:2 to 15:1.

13. The foam of claim 1 further comprising a halogenated flame retardant C).

14. The foam of anyone of claim 10, wherein the first category polymer resin of the polymer matrix B) is graft modified with at least 0.1 weight-percent polar groups.

15. The foam of claims 10, wherein the first category polymer resin of the polymer matrix B) is graft-modified with up to 10 weight-percent polar groups.

16. The foam of claims 10, wherein the weight ratio of the first category polymer resin of the polymer matrix B) to the particulate additive A) is in the range from 0.1:1 to 3:1.

17. The foam of claim 1 having art average cell size, measured according to ASTM D3575, of at least 4.5 mm.

18. The foam of claim 1 having an average sound absorption coefficient (measured via ASTM E1050 at 250, 500, 1000 and 2000 hertz (Hz) sound frequencies) of at least 0.15.

19. The foam of claim 1 in the form of an office partition, automotive decoupler, domestic appliance sound insulation, industrial noise absorber, sound proofing panel, hanging baffle, or machine enclosure.

20. A Method of Using the foam of claim 1 as an acoustic absorption material comprising the step of locating the foam in the presence of a sound intensity of at least 50 decibels.

* * * * *